Sept. 10, 1929.  G. J. DARRIEUS  1727,811
SUPPORTING FRAME FOR ELECTRIC LINES
Filed Oct. 16, 1924
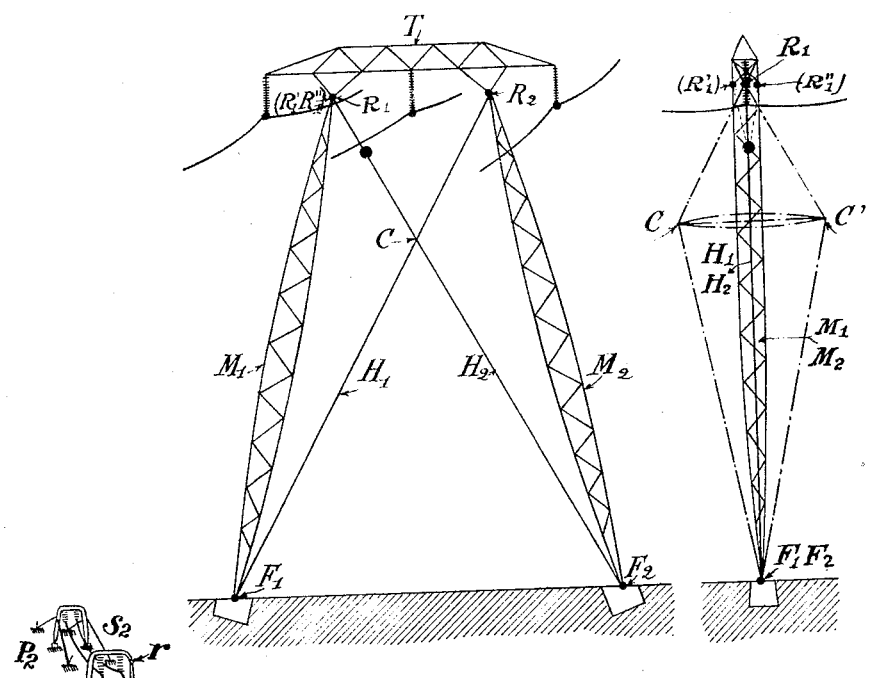
Fig.1  Fig.2
Fig. 3.
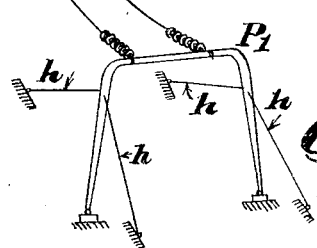
Inventor
G. J. Darrieus
by Marks & Clerk
Attys.

Patented Sept. 10, 1929.

1,727,811

UNITED STATES PATENT OFFICE.

GEORGES JEAN DARRIEUS, OF PARIS, FRANCE, ASSIGNOR TO COMPAGNIE ELECTRO-MECANIQUE, OF PARIS, FRANCE.

SUPPORTING FRAME FOR ELECTRIC LINES.

Application filed October 16, 1924, Serial No. 744,047, and in France November 5, 1923.

The supporting devices for overhead electric lines are as a rule composed, for a given line, of two classes:

(1) The major part of such devices, employed in the portions which are approximately in alignment, comprises supports adapted solely to maintain the electric line and to withstand the transverse stresses due to the wind, and also adapted in most cases to withstand the accidental rupture of a wire on one of the adjacent spans.

(2) Supports of a stronger nature, termed main or anchoring supports, which are spaced at suitable distances and chiefly at the points where the line changes its direction, these being so constructed as to withstand stresses due to the total rupture of the wires upon any one side.

By reason of the necessity of providing supports or towers of the current types in order to withstand in all directions a moment of flexion exercised at the base and increasing rapidly with the height, it is the usual practice to increase the moment of inertia i. e. the area of the base, in proportions which although admissible for outlying regions, would occasion serious objections in regions in which the value of cultivated land is much greater.

A known means for reducing the area of the base of such towers, and for lightening them at the same time, consists in the use of towers of the so-called elastic type which possess a great rigidity in the direction transversal to that of the line, but are susceptible of flexion in the lengthwise direction in case of rupture of the wires, thus partially avoiding the effect of the moment of flexion in virtue of the diminution in the tension of the line which is occasioned by their distortion.

But the effectiveness of this method is limited to the case of relatively short spans, for which a small displacement of the top of the tower will cause an augmentation of the sag and an appreciable reduction in the tension of the wires which are not yet broken.

It has already been proposed, for transmission lines provided with a steel earth-wire attached to the top of the girder poles, to provide the intermediate supports with a joint horizontal at the level of the ground, in such a manner that they can turn around an axis at right angles to the line and to provide on the other hand a mechanical connection between the tops of these supports by means of the earth-wire, suitably strengthened for this purpose.

The object of the present invention is an intermediate supporting frame for electric lines whose functions are strictly limited to the two essential functions of supporting the line and withstanding the transverse stresses, whereas the main or anchoring towers assume the work of maintaining the whole of the line in stable equilibrium in the longitudinal direction.

A further object of this invention is an overhead electric line the intermediate supports of which have the aforesaid structure, whereas the main or anchoring towers are of any known type, but may also be built by completing the structure of the said intermediate supports with suitable connections to anchors in the ground in the direction of the line.

By designing and using the structure of the intermediate supporting frames according to the present invention, it must be kept in mind that said supports may be maintained upright only by the weight of the line itself, even in the case where the latter is only supported through the flexible means of suspended insulator chains; this is a very new and essential feature of the proposed structure.

In order to attain the above mentioned performances, it is sufficient that these intermediate supports be free to move around an axis which is approximately at right angles with the transmission line and which is inclined, say in the transverse direction parallel to the formation of the ground when the line has to pass over or mount the top of a hill or the ridge of a boulder. The said degree of freedom to move may be carried out by means of any joint whatsoever at a sufficient height under the level of the conductors. In the examples hereinafter described, such articulation is obtained by means of ball and socket joints at the lower extremity of the two legs or uprights.

The first condition to be realized is that the whole arrangement comprised between two main towers and consisting of $n$ spans of equal length and $n^1$ supports or towers of the pivoted type, shall be stable, i. e. that when the system is brought out of its position of equilibrium in any manner it will always tend to resume the normal position in which all the supports are vertical. It is shown by calculation that for the usual weights of the supports and lines, this condition can be readily complied with, and it will allow of inserting between any two main towers a considerable number of the said supports.

According to the second condition, which is of a more restricting nature, when the wind blows in the direction of the line, firstly, the additional stress upon the wires due to the effect of traction occasioned upon said wires by the towers when acted upon by the wind, must not exceed the limits which correspond to the admitted coefficient of safety, and for which the main towers are normally constructed; and secondly, the augmentation of the sag which is occasioned, in the spans placed leeward by the inclined position assumed by the supports, must not cause the wire to descend below the level stipulated by the regulations.

A third condition may also be taken into account, wherein the supports may for example withstand the rupture of a wire upon one side alone. But while this accident produces in the normal tower a moment of flexion increasing with the height and also a moment of torsion, only this latter will prevail in the said support or frame, and is independent of the height, so that such supports can be made much lighter.

But according to the present invention it is possible to go still further and also, in opposition to the known structures, to eliminate even this moment of torsion by dispensing with the provision of any resistance to this kind of effort, that is to say by providing the support with new internal articulations which give to the support at least a supplementary degree of freedom to move, and allow the whole structure, not only to incline itself in the direction of the line about a straight line connecting the feet of the uprights, but also to turn about the vertical axis of symmetry of the support. As the relative movements which are permitted by said degrees of freedom to move appear between the several elements of the frame structure itself, these degrees of freedom to move are called internal degrees of freedom to move.

In this manner, the intermediate supports can be made very light, inasmuch as the essential parts thereof are subjected solely to traction and compression stress, whilst the masonry of the foundation as a whole is not subjected to any moment tending to overthrow it, but solely to normal strains, and hence its size can be reduced to a minimum.

Due to the smaller size of the supports or frames, these latter can be secured in the foundation with greater facility and the number of such supports can be reduced, since the most economical value of the span will be increased from the fact that the weight of this type of support or frame will increase less rapidly in relation to the height than for the usual supports.

As concerns the main or anchoring towers, these may (1) be employed without any difference from the known types, even in size, or (2) in a more simple manner, they may consist of frames of the same type as the intermediate supports, but suitably braced in the direction of the line by strain wires or cables which are connected to anchors in the ground.

The accompanying diagrammatic drawings show by way of examples several embodiments of the invention, which obviously may also be realized in very numerous different forms without departing out of the scope of said invention.

Especially it is immaterial that the lines, are borne on pin type insulators or hang on insulator chains.

Figs. 1 and 2 illustrate an embodiment of the invention in the case of an electric three phase transmission line hanging on insulator chains for very high voltage: Fig. 1 is a front view of the frame structure, Fig. 2 a side-view from the left side of the same.

Fig. 3 is a diagrammatic perspective view of a section of an electric monophase transmission line hanging on insulator chains and provided with supporting frame according to the invention.

With reference to Figs. 1 and 2 the uprights $M_1$, $M_2$, which are pivoted at the ground level by means of ball-and-socket joints $F_1$ and $F_2$ to the masonry foundations, support at their upper part (by means of the joints $R_1$ $R_2$) the cross-piece T to which are attached the several insulators. The trapezoid thus formed is braced transversally by the tie-rods or cables $H_1$ and $H_2$.

In the form above described, the said support is not only free to assume an inclination in the longitudinal direction, but on the other hand it offers no resistance to the torsional stresses occasioned by the rupture of a wire and tending to distort it.

The stability of the crosspiece T upon its pivots $R_1$ $R_2$ may be obtained by suitably attaching the said tie rods $H_1$, $H_2$, as illustrated by the dotted lines in Fig. 2; or by replacing one of the said ball joints, say $R_1$, by a pivot joint (hinge) $R'_1$, $R''_1$, (between brackets in Figs. 1 and 2), operating in only one direction and allowing only a rotation on an axis parallel to the line.

If with this facility of distortion, whereby the minimum weight can be obviously obtained, there is danger that excessive strains shall be brought upon the central wire in the event of rupture of one of the lateral wires should the line for example not be provided with an earth connection, the said support can be stiffened against torsional stresses, by doubling each of the guy ropes or wires $H_1$ $H_2$ as shown by dot and dash lines in Fig. 2, and by inserting between the two pairs of tie rods whose crossing points C and $C_1$ are projecting themselves at C (Fig. 1), a link C C' parallel to the line as shown in the side-view, Fig. 2.

Referring to Fig. 5 of the drawings, the section of the electric transmission line comprises for example three consecutive spans between two suitably fastened anchor-supports $P_1$ $P_2$. The two intermediate supports $S_1$ $S_2$, devoid of guy ropes and articulated at or near the level of the ground, are maintained in equilibrium only by the return of the pendulums formed by the insulator chains subjected to the weight of the line; these supports can moreover be rendered deformable for example by means of a supplementary ball and socket joint arranged at $r$, without their stability being impaired. The two anchor supports $P_1$ $P_2$ at the ends of the section, may be of the same type as the intermediate supports but possess, in this case, their own stability owing to the ropes $h$ which connect said supports $P_1$ $P_2$ with the ground in the direction of the line.

If the hereinbefore described constructional forms comprise the use of tie rods or cables, it will be obviously feasible without departing from the invention to utilize the current method of construction of metallic towers formed of rigid elements which are connected together either directly or by means of joints. The latter may be constructed in the same manner as the analogous elements employed in metallic bridges, or by means of rollers travelling upon roller races of adequate form, or by means of links, shackles or the like, determining between the parts which they connect virtual axes or instantaneous centres of rotation, suitably disposed according to the known rules of kinetics, so as to bring about an accordance between the desired stability and the obtainment of the adequate additional degree of freedom to move.

Claims:

1. An intermediate supporting frame structure for electric transmission lines capable of supporting the lines and of withstanding transverse stresses comprising rigid uprights, foundations therefor, means connecting said uprights with said foundations whereby the uprights are free to pivot about an axis perpendicular to said lines, and rigid cross pieces connecting adjacent pairs of uprights, said cross pieces being adapted to carry the transmission lines.

2. An intermediate supporting frame structure for electric transmission lines capable of supporting the lines and of withstanding transverse stresses comprising rigid uprights, foundations therefor, flexible joints connecting said uprights to said foundations whereby the uprights are free to pivot about an axis perpendicular to the lines and rigid cross pieces disposed on said uprights, said cross pieces being adapted to carry the transmission lines.

3. An intermediate supporting frame structure for electric transmission lines capable of supporting the lines and of withstanding transverse stresses comprising a pair of rigid uprights, foundations for said uprights, ball and socket joints connecting said uprights at their lower extremities with said foundations, and a rigid cross piece connecting the upper extremities of said uprights, said cross piece being adapted to carry the transmission lines.

4. An intermediate supporting frame structure for electric transmission lines capable of supporting the lines and of withstanding transverse stresses comprising a pair of rigid uprights, foundations for said uprights, ball and socket joints connecting said uprights at their lower extremities with said foundations, a rigid cross piece connecting the upper extremities of said uprights, said cross piece being adapted to carry the transmission lines and a plurality of tie rods diagonally connecting the upper and lower extremities of the uprights in order to stiffen the same.

5. An intermediate supporting frame structure for electric transmission lines capable of supporting the lines and of withstanding transverse stresses comprising a pair of rigid uprights, foundations for said uprights, ball and socket joints connecting said uprights at their lower extremities with said foundations, a rigid cross piece connecting the upper extremities of said uprights, said cross piece being adapted to carry the transmission lines, a plurality of tie rods diagonally connecting the upper and lower extremities of the uprights in order to stiffen the same and a bar disposed between the diagonal tie rods at the intersection thereof.

6. An intermediate supporting frame for electric transmission lines capable of supporting the lines and of withstanding transverse stresses, comprising rigid uprights free to pivot about an axis substantially at right angle with the line, rigid cross pieces connected to said uprights by means of at least one joint, which confers to the frame structure at least one internal degree of freedom to move, said cross pieces being adapted to carry the transmission lines, which in turn maintain by virtue of their weight, the whole structure in stable equilibrium.

7. In an electric line comprising stationary supports to which the line wires are attached, and intermediate supports whereby the said line wires will be supported at points between the said stationary supports, an intermediate support comprising at least two rigid portions one of which may be pivoted with reference to the ground about an axis which is substantially horizontal and is at right angles to the electric line, whereas the other may oscillate with reference to the first-mentioned portion about an axis which is other than the first-mentioned axis, and insulators adapted to transmit to the said second portion the effect of gravity upon the said line wires.

8. The combination of stationary supports, of intermediate supports placed at intervals between the said stationary supports, electric line wires attached to the said stationary supports, and means connecting said wires to said intermediate supports, each of the latter being freely pivoted on its base and adapted for free distortion, said intermediate supports being held upright solely by the action of gravity upon the said line wires.

9. The combination of stationary supports, of intermediate supports placed at intervals between the said stationary supports, each intermediate support comprising rigid elements which rest upon the ground by means of bottom joints and are connected together at the top by at least one joint, said top and bottom joints being so disposed that the whole support will be pivoted on at least one axis passing through the said bottom joints and that said support will be subject to turn about a second axis independent of the preceding, said axis passing through one of the said bottom joints and a top joint, insulators mounted on the said supports and electric wires mounted on said insulators, said supports being held upright solely by the efforts which the line, under the action of gravity, will impart to the said supports.

In testimony that I claim the foregoing as my invention, I have signed my name.

GEORGES JEAN DARRIEUS.